(12) United States Patent
Sivaraj (10) Patent No.: US 10,829,014 B2
(45) Date of Patent: Nov. 10, 2020

(54) VEHICLE SEAT

(71) Applicant: Adient Engineering and IP GmbH, Burscheid (DE)

(72) Inventor: Srinivasan Sivaraj, Leverkusen (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/424,867

(22) Filed: May 29, 2019

(65) Prior Publication Data

US 2019/0366886 A1 Dec. 5, 2019

(30) Foreign Application Priority Data

May 30, 2018 (DE) .................. 10 2018 112 926

(51) Int. Cl.
| | |
|---|---|
| *B60N 2/02* | (2006.01) |
| *B60N 2/04* | (2006.01) |
| *B60N 2/06* | (2006.01) |
| *B60N 2/10* | (2006.01) |
| *B60N 2/12* | (2006.01) |
| *B60N 2/30* | (2006.01) |
| *B60N 2/36* | (2006.01) |
| *B60N 2/75* | (2018.01) |

(52) U.S. Cl.
CPC ........... *B60N 2/309* (2013.01); *B60N 2/3009* (2013.01); *B60N 2/3065* (2013.01); *B60N 2/757* (2018.02)

(58) Field of Classification Search
CPC .... B60N 2/3009; B60N 2/3065; B60N 2/309; B60N 2/757

USPC ............................................. 297/334, 378.14
See application file for complete search history.

(56) References Cited

U.S. PATENT DOCUMENTS

| | | | |
|---|---|---|---|
| 6,000,742 A | 12/1999 | Schaefer et al. | |
| 6,578,919 B2* | 6/2003 | Seibold | B60N 2/045 297/334 X |
| 6,601,900 B1* | 8/2003 | Seibold | B60N 2/0292 297/334 X |
| 6,817,669 B2* | 11/2004 | Roth | B60N 2/01583 297/334 |
| 6,860,562 B2* | 3/2005 | Bonk | B60N 2/01583 297/378.14 X |

(Continued)

FOREIGN PATENT DOCUMENTS

| | | |
|---|---|---|
| DE | 10056024 A1 | 6/2002 |
| DE | 10149858 C2 | 10/2003 |

(Continued)

*Primary Examiner* — Rodney B White
(74) *Attorney, Agent, or Firm* — Marshall & Melhorn, LLC (57) ABSTRACT

A vehicle seat (100, 200), transferable from a use position into a non-use position, includes a seat part (120, 220), a backrest (110, 210), and a base (140, 240). A front rocker (160, 260) is articulated via a first joint (I) on the base/ adapter (150, 250) fixed to the base, and is articulated via a second joint (II) on the seat part with limited displaceability. A rear rocker (170, 270) is articulated via a third joint (III) on the base/adapter fixed to the base and is articulated via a fourth joint (IV) on the seat part. A locking device (162, 262) locks the first joint, the second joint or the fourth joint to lock the front rocker about the first joint. A fifth joint (V) pivotably connects the backrest to the rear rocker. A pivoting movement of the backrest about the fifth joint can be locked.

18 Claims, 5 Drawing Sheets

(56) References Cited

U.S. PATENT DOCUMENTS

| | | | | |
|---|---|---|---|---|
| 6,964,452 B2 * | 11/2005 | Kammerer | B60N 2/10 | |
| | | | 297/334 X | |
| 7,121,624 B2 * | 10/2006 | Pejathaya | B60N 2/0232 | |
| | | | 297/378.14 X | |
| 7,188,906 B2 | 3/2007 | Christoffel et al. | | |
| 7,300,107 B2 * | 11/2007 | Kammerer | B60N 2/0292 | |
| | | | 297/334 X | |
| 7,393,056 B2 * | 7/2008 | O'Connor | B60N 2/01583 | |
| | | | 297/378.14 X | |
| 7,413,251 B2 * | 8/2008 | Link | B60N 2/0705 | |
| | | | 297/334 | |
| 7,497,517 B2 * | 3/2009 | Gundall | B60N 2/206 | |
| | | | 297/334 X | |
| 7,651,166 B2 * | 1/2010 | Schwingenschlogel | | |
| | | | B60N 2/206 | |
| | | | 297/334 X | |
| 7,686,397 B2 * | 3/2010 | Sahi | B60N 2/12 | |
| | | | 297/334 | |
| 7,766,430 B2 * | 8/2010 | Ventura | B60N 2/22 | |
| | | | 297/334 X | |
| 7,802,850 B2 * | 9/2010 | Deißmann et al. | B60N 2/0232 | |
| | | | 297/378.12 | |
| 7,963,604 B2 * | 6/2011 | Becker | B60N 2/12 | |
| | | | 297/378.14 X | |
| 8,096,616 B2 * | 1/2012 | Ventura | B60N 2/206 | |
| | | | 297/334 X | |
| 8,186,758 B2 * | 5/2012 | Maier | B60N 2/3031 | |
| | | | 297/334 X | |
| 8,256,844 B2 * | 9/2012 | Yamazaki | B60N 2/0705 | |
| | | | 297/334 | |
| 8,308,238 B2 * | 11/2012 | Imaoka | B60N 2/688 | |
| | | | 297/334 X | |
| 8,474,910 B2 * | 7/2013 | Kammerer | B60N 2/22 | |
| | | | 297/334 | |
| 8,616,642 B2 * | 12/2013 | Sung | B60N 2/3065 | |
| | | | 297/334 | |
| 8,702,172 B2 * | 4/2014 | Schmodde | B60N 2/015 | |
| | | | 297/378.14 X | |
| 8,882,197 B2 * | 11/2014 | Line | B60N 2/2356 | |
| | | | 297/334 X | |
| 9,365,137 B2 * | 6/2016 | Lee | B60N 2/20 | |
| 9,545,857 B2 * | 1/2017 | Cooley | B60N 2/3009 | |
| 9,908,445 B2 * | 3/2018 | Park | B60N 2/309 | |
| 10,023,081 B2 * | 7/2018 | Akutsu | B60N 2/015 | |
| 10,124,703 B2 * | 11/2018 | Ecker | B60N 2/3011 | |
| 10,239,427 B2 * | 3/2019 | Keyser | B60N 2/3065 | |
| 2004/0084946 A1 * | 5/2004 | Bonk | B60N 2/305 | |
| | | | 297/378.14 | |
| 2005/0269830 A1 * | 12/2005 | Epaud | B60N 2/3031 | |
| | | | 296/65.09 | |
| 2006/0061183 A1 * | 3/2006 | White | B60N 2/986 | |
| | | | 297/378.12 X | |
| 2006/0273645 A1 * | 12/2006 | Ferrari | B60N 2/3011 | |
| | | | 297/378.12 X | |
| 2008/0122280 A1 * | 5/2008 | Jaranson | B60N 2/3065 | |
| | | | 297/341 | |
| 2009/0085391 A1 | 1/2009 | Steinert | | |
| 2013/0090204 A1 | 4/2013 | Stilleke et al. | | |
| 2018/0079333 A1 * | 3/2018 | Ma | B60N 2/2245 | |
| 2018/0281634 A1 * | 10/2018 | Furukawa | B60N 2/3065 | |
| 2019/0092191 A1 * | 3/2019 | Bouzid | B60N 2/12 | |
| 2020/0101872 A1 * | 4/2020 | Epaud | B60N 2/0232 | |
| 2020/0139865 A1 * | 5/2020 | Weinberger | B60N 2/757 | |

FOREIGN PATENT DOCUMENTS

| | | | | |
|---|---|---|---|---|
| DE | 102004005980 B3 | 6/2005 | | |
| DE | 102006015560 B3 | 8/2007 | | |
| DE | 102008050468 B3 | 4/2010 | | |
| DE | 102010022615 A1 | 12/2011 | | |
| DE | 102011101879 A1 | 11/2012 | | |
| DE | 102008019527 B4 * | 7/2013 | | B60N 2/235 |
| DE | 102006028899 B4 | 2/2015 | | |
| FR | 2898554 B1 * | 3/2009 | | B60N 2/3093 |
| FR | 2968612 A1 * | 6/2012 | | B60N 2/3065 |
| FR | 3025757 B1 * | 9/2016 | | B60N 2/065 |
| WO | 02/22391 A1 | 3/2002 | | |
| WO | 2002092382 A1 | 11/2002 | | |
| WO | 2018046433 A1 | 3/2018 | | |

* cited by examiner

VEHICLE SEAT

CROSS REFERENCE TO RELATED APPLICATIONS

This application claims the benefit of priority under 35 U.S.C. § 119 of German Application 10 2018 112 926.2, filed May 30, 2018, the entire contents of which are incorporated herein by reference.

TECHNICAL FIELD

The invention relates to a vehicle seat, in particular motor vehicle seat, which can be transferred from at least one use position suitable for passenger conveyance into at least one non-use position.

TECHNICAL BACKGROUND

DE 10 2008 050 468 B3 discloses a vehicle seat which can be transferred from a use position suitable for passenger conveyance into a pivoted-forward non-use position, comprising: a base; a rocker which is articulated on a front foot; a seat cushion which is articulated on the rocker and has, as structure, a seat cushion carrier from which an arm projects at the rear, a joint being arranged on the end of said arm; a link which is articulated on the front foot; a rear foot which is articulated on the link and can be releasably locked to the base; and a backrest which is articulated on the rear foot by means of at least one lockable fitting so as to be pivotable about a backrest pivot axis and which is adjustable in its inclination relative to the rear foot, wherein the seat cushion is articulated on the backrest by means of the joint so as to be offset with respect to the backrest pivot axis.

WO 2002/092382 A1 discloses a vehicle seat which has a use position and an ingress/egress position. The vehicle seat comprises a rising supporting element which is suitable to be articulated on a vehicle interior floor, a backrest which is articulated on the rising supporting element, an upper element which is articulated on the backrest, and a front leg which is articulated on the upper element and is suitable to be articulated on the vehicle interior floor. An ingress/egress mechanism is configured to fasten the rising supporting element and the vehicle interior floor relative to one another, wherein the seat can be brought into the ingress/egress position by the ingress/egress mechanism being unlocked and the seat being pivoted in a forward direction, wherein the backrest remains fixed relative to the rising supporting element if the seat is moved from the use position into the ingress/egress position.

WO 2018/046433 A1 discloses a vehicle seat which can be transferred from a use position suitable for passenger conveyance into a non-use position, having a seat cushion with a seat cushion carrier, a backrest, a base which can be connected to a vehicle, a rocker which is pivotably connected by means of a first joint to the base or to a component fixedly connected to the base, and is pivotably connected by means of a second joint to the seat cushion carrier of the seat cushion, a rear foot which is pivotably connected by means of a third joint to the base or to a component fixedly connected to the base, wherein a pivoting movement of the rear foot about the third joint can be locked, and wherein the rear foot is pivotably connected by means of a fourth joint to the backrest, and a fifth joint which connects the backrest to the seat cushion carrier, wherein at least one of the joints is a fitting

SUMMARY

An object on which the invention is based is to improve a vehicle seat of the type stated at the outset. In particular, the vehicle seat is comprised by a vehicle seat with precisely one seating position, but which is also structurally reconfigurable into a vehicle seat with two seating positions using as many identical parts as possible. It is intended thereby to be able to make available a seat row with a 40% vehicle seat and a 60% vehicle seat, wherein the two vehicle seat have as many identical parts as possible and identical basic kinematics. In particular, it is intended for the vehicle seat to be able to be configured in such a way that such vehicle seat has two fully valid seating positions with two backrests which can be folded independently of one another and a one-part seat part (seat cushion). It is intended to be possible to be able to fold one of the two backrests forwards in order to increase the loading volume, and nevertheless to be able to continue to use one of the two seating spaces for passenger transport. In the case of the vehicle seats known from the prior art stated at the outset, this is not possible since pivoting of one of the backrests would automatically cause the entire seat part to be lowered, with the result that the seat part would no longer be suitable for passenger transport.

This object is achieved according to the invention by a vehicle seat, in particular motor vehicle seat, which can be transferred from at least one use position suitable for passenger conveyance into at least one non-use position, having: a seat part, a backrest, a base which can be connected to a vehicle, a front rocker which is pivotably articulated by means of a first joint on the base or on an adapter fixedly connected to the base, and is pivotably articulated by means of a second joint on the seat part with limit displaceability, a rear rocker which is pivotably articulated by means of a third joint on the base or on an adapter fixedly connected to the base, wherein the rear rocker is pivotably articulated by means of a fourth joint on the seat part, a locking device for locking the first joint or the second joint or the fourth joint, in particular for locking the pivoting movement of the front rocker about the first joint, and a fifth joint which pivotably connects the backrest to the rear rocker, wherein a pivoting movement of the backrest about the fifth joint can be locked.

By virtue of the fact that the backrest is pivotably connected to the rear rocker by means of the fifth joint, wherein a pivoting movement of the backrest about the fifth joint can be locked, and the rear rocker is pivotably articulated by means of a fourth joint on the seat part, the vehicle seat can be selectively configured as a vehicle seat with precisely one seating position or as a vehicle seat with two fully valid seating positions having two backrests which can be folded independently of one another and a one-part seat part. Here, the claimed kinematics must be present only on one seat side. The kinematics of the second seat side can be configured in a modified manner, with, for example, it being possible for a lockable fitting to be replaced by a non-lockable rotary joint.

The third joint (the articulated connection between the base or an adapter fixedly connected to the base and the rear rocker) can be a fitting. Since the third joint is a fitting, a cost-effective vehicle seat is provided which has only few components. There is additionally avoided a risk of injury when pivoting back the vehicle seat from an ingress position into a use position. The rear rocker has no further components, in particular no lock, which could injure a passenger of a seat row arranged behind the vehicle seat when pivoting back the rear rocker into the use position. Alternatively, the third joint can be lockable by means of a lock, in particular a rotary latch lock.

The fifth joint (the articulated connection between the rear rocker and the backrest) can be a fitting. Since the fifth joint is a fitting, a cost-effective vehicle seat can be provided which has only few components. Alternatively, the fifth joint can be lockable by means of a lock, in particular a rotary latch lock.

The third joint and/or the fifth joint can be a lockable latching fitting or a geared fitting. A latching fitting has a first fitting part and a second fitting part. The first fitting part and the second fitting part are pivotable relative to one another in an unlocked state of the latching fitting. The latching fitting can have at least one bolt which is movably guided in one of the two fitting parts between a locked state and an unlocked state and which interacts in the locked state with a ring gear of the other of the two fitting parts. A latching fitting is known from DE 10 2006 015 560 B3, for example. The corresponding publication US 2009/0085391 A1 is hereby incorporated by reference in its entirety. A latching fitting is also referred to as a discontinuous fitting.

In particular for the electrification of the vehicle seat according to the invention, at least one fitting can be configured as a geared fitting. A geared fitting is also referred to as a continuous fitting or tumbling fitting. A geared fitting is known from DE 10 2010 022 615 A1, for example. The corresponding publication US 2013/0090204 A1 is hereby incorporated by reference in its entirety. In combination with an electrical drive, a geared fitting allows an electrically operated transfer between the use position and the non-use position. A fitting configured as a geared fitting can allow a rotary movement of the rear rocker with a superimposed tumbling movement.

Since the joint configured as a fitting can be selectively a latching fitting or geared fitting, a module is made available by means of which both a manual vehicle seat and an electrically driven vehicle seat can be created by selecting the fitting type.

In addition, geared fittings can be used which do not have a tumbling movement but a purely rotating output movement, as known from DE 10 2004 005 980 B3, for example. In principle, the fitting can also be based on other types of gear mechanism.

The vehicle seat can be able to be transferred from the at least one use position into an ingress position as non-use position. The first joint, the second joint, the third joint and the fourth joint can form a first four joint arrangement for transferring the vehicle seat from the at least one use position into the ingress position. The vehicle seat can be able to be transferred from the at least one use position into a floor position as non-use position.

The base is preferably formed as a seat rail arrangement configured to provide a longitudinal adjustment of the vehicle seat in and counter to a longitudinal direction. As a result, the seat can be brought into an ingress position in which it is displaced forwards in the longitudinal direction with respect to the at least one use position. This particularly facilitates access to a seat row arranged behind the vehicle seat.

The vehicle seat can have a second backrest which is selectively pivotable, together with the backrest or separately from the backrest, about a backrest pivot axis defined by the fifth joint. As a result, a vehicle seat having two seating positions can be made available in which, while maintaining one of the two seating positions, and to increase the loading volume of the vehicle, the second backrest is pivotable into preferably a substantially horizontal position.

The second backrest can be able to be locked to the backrest by means of a lock. The lock can be a rotary latch lock. The rotary latch lock can be fastened to the backrest and can lockingly receive a counter-element fastened to the second backrest, in particular a wire, a pin or a bow.

The invention is explained in more detail below with reference to two advantageous exemplary embodiments illustrated in the figures. However, the invention is not limited to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
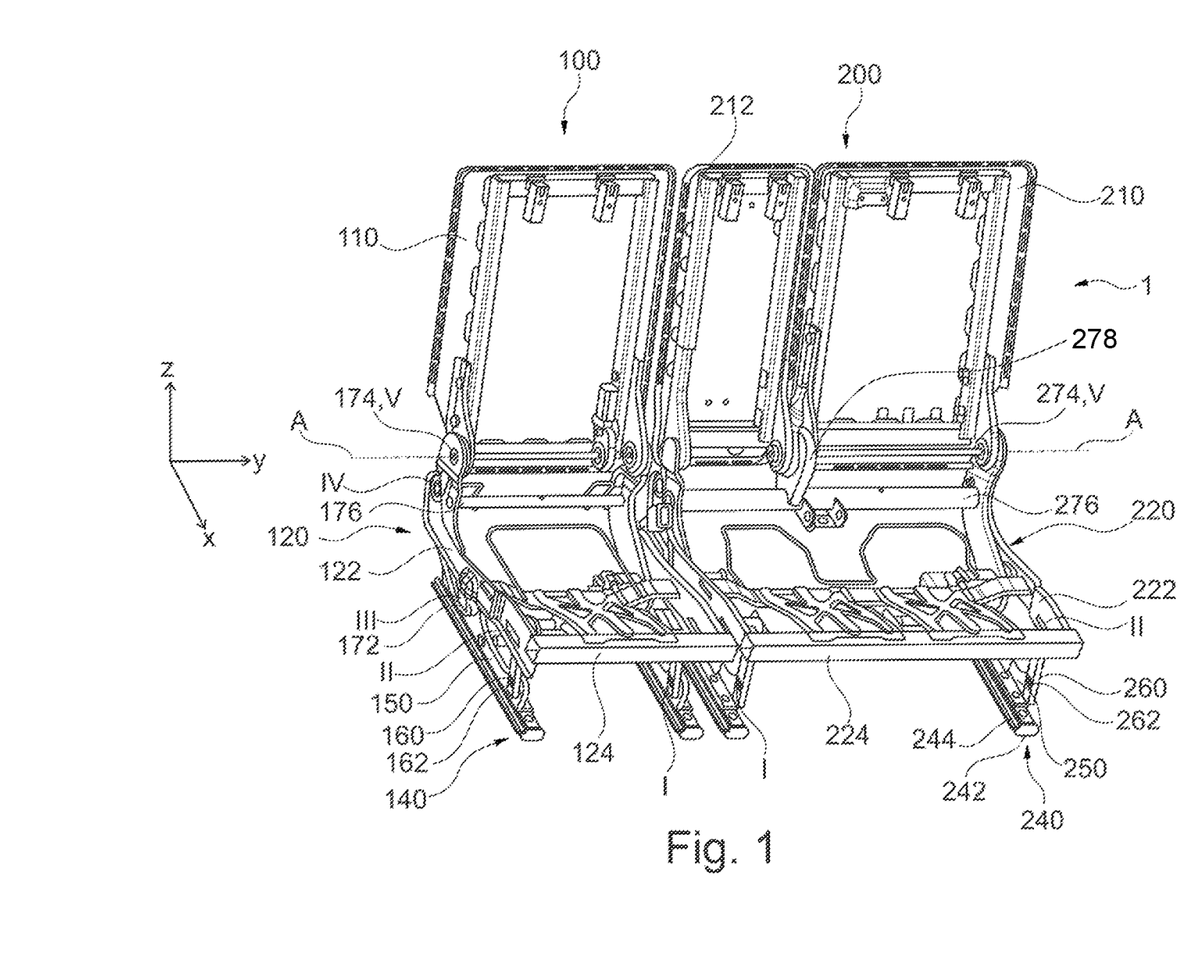
FIG. 1 is a perspective illustration of a 40%-60%-split seat row having two vehicle seats formed according to the invention which are arranged next to one another, wherein one of the two vehicle seats has two backrest parts.
Figure 2:
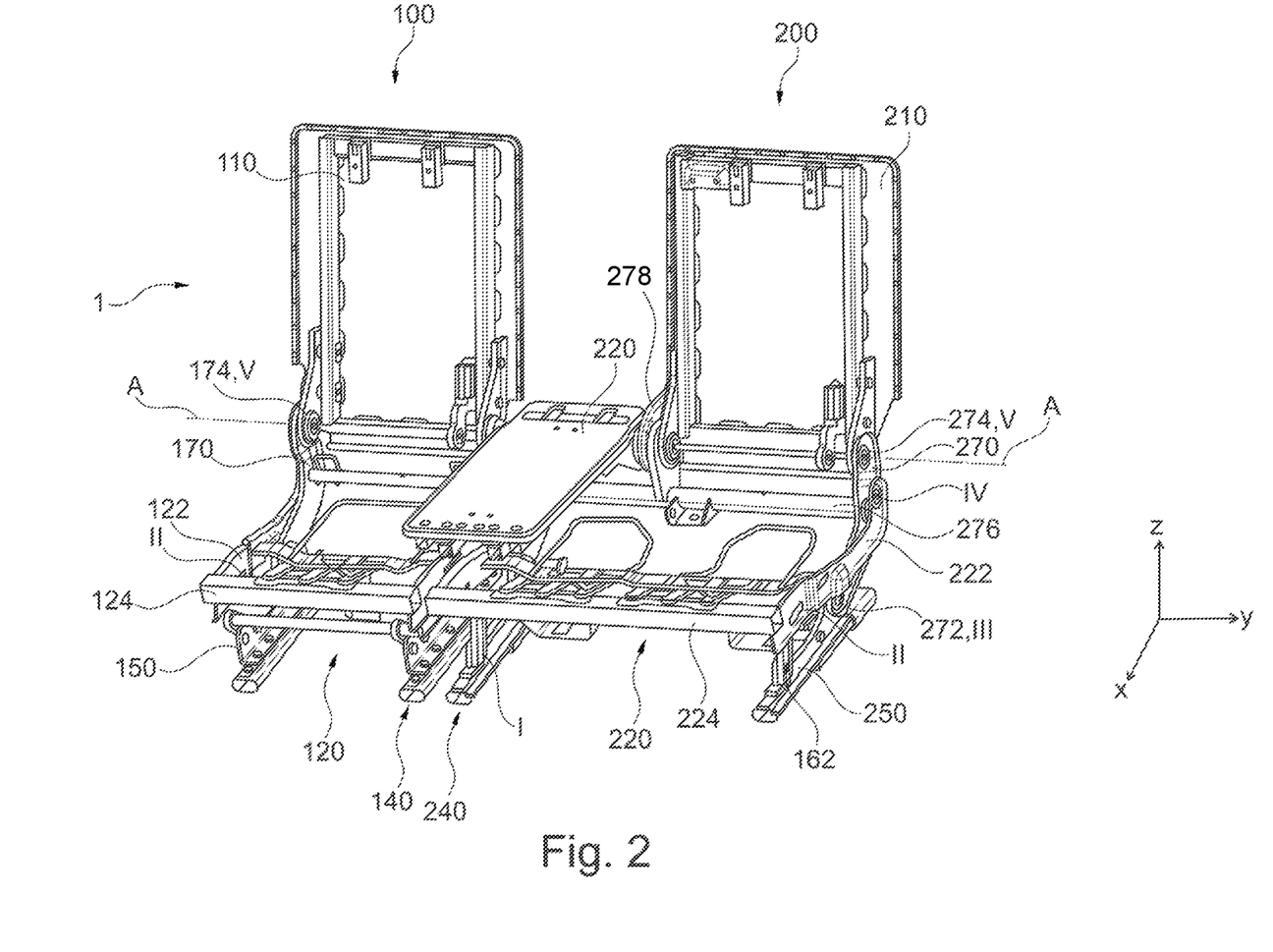
FIG. 2 is a further perspective illustration of the seat row from FIG. 1, wherein a central backrest is folded down forwards.

Referring to the drawings, FIGS. 1 and 2 show a seat row 1 for a vehicle, in particular motor vehicle, wherein a padding of the seat row 1 that comprises foam parts and seat covers is not illustrated. The seat row 1 is, for example, a central seat row of a vehicle, for example of a van. The seat row 1 is split in a ratio of 40% to 60% and has two vehicle seats 100, 200. A vehicle seat 100 constitutes a first exemplary embodiment of a vehicle seat according to the invention and the 40% part of the seat row 1 and offers a seating position for precisely one person. In the present case, the vehicle seat 100 provides the outer right seating position of the seat row 1. The other vehicle seat 200 constitutes a second exemplary embodiment of a vehicle seat according to the invention and the 60% part of the seat row 1 and offers a respective seating position for precisely two persons. In the present case, the vehicle seat 200 provides the central seating position and the outer left seating position of the seat row 1. The vehicle seats 100, 200 are preferably configured completely separately from one another. Each of the two vehicle seats 100, 200 is configured according to the invention.

Figure 3:
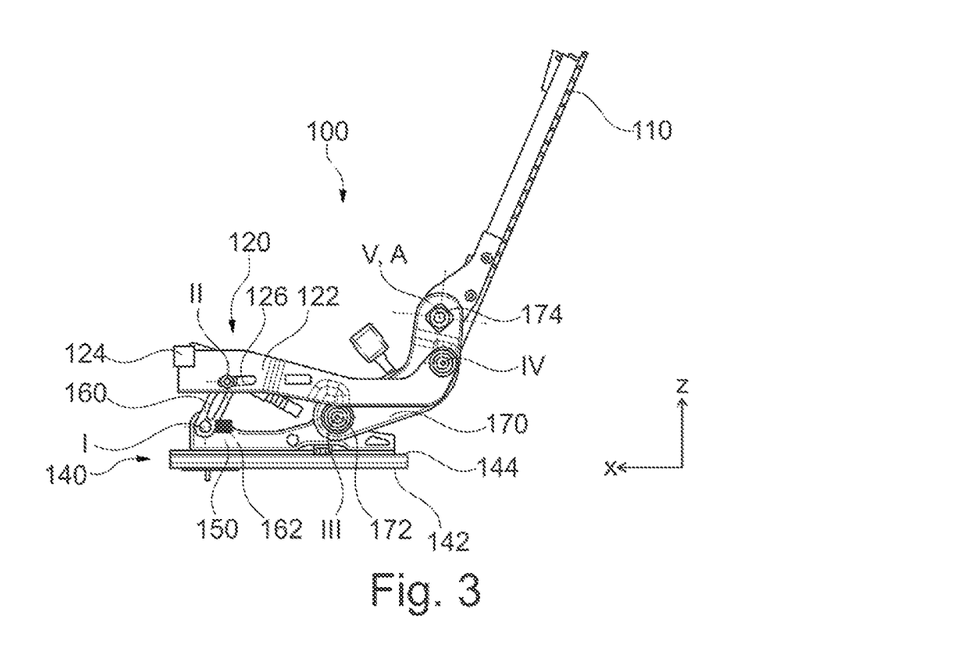
FIG. 3 is a schematic side view of one of the two vehicle seats according to the invention from FIG. 1 in a use position.
Figure 7:
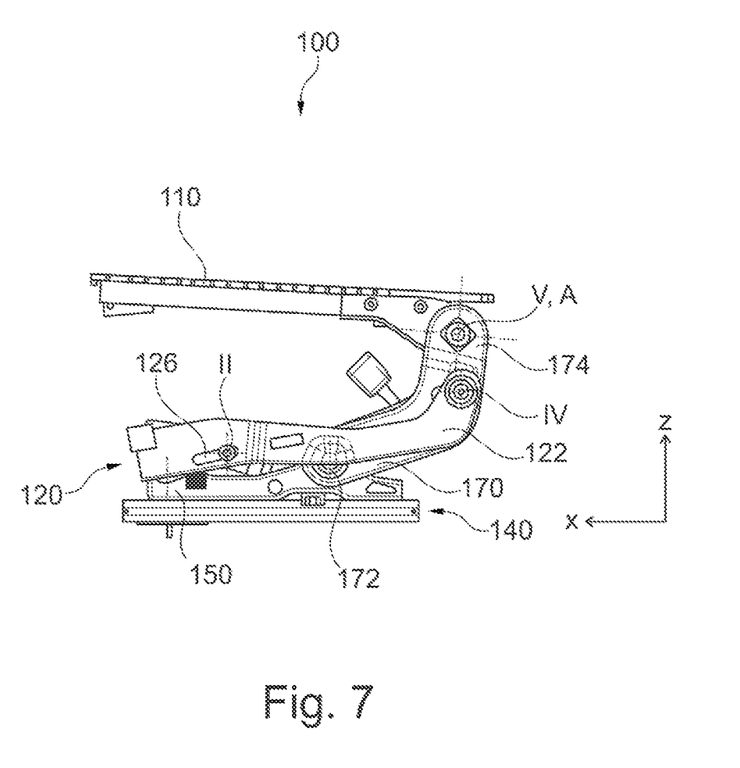
FIG. 7 is a schematic side view of the vehicle seat from FIG. 3 in the floor position.

The vehicle seat 100 with precisely one seating position can selectively assume at least one use position (FIG. 3) suitable for passenger conveyance, an ingress position (FIG. 5) or a floor position (FIG. 7). The vehicle seat 200 having two seating positions can also selectively assume at least one use position suitable for passenger conveyance, an ingress position or a floor position. In the ingress position, access for a person to a further seat row arranged behind the vehicle seats 100, 200 is facilitated. In the floor position, the vehicle seats 100, 200 each serve as a loading floor of the vehicle.

The vehicle seats 100, 200 are described below using three spatial directions extending perpendicular to one another. With the vehicle seats 100, 200 installed in the vehicle, a longitudinal direction x extends substantially horizontally and preferably parallel to a vehicle longitudinal direction which corresponds to the usual direction of travel of the vehicle. A transverse direction y extending perpendicularly to the longitudinal direction x is also oriented horizontally in the vehicle and extends parallel to a vehicle transverse direction. A vertical direction z extends perpendicularly to the longitudinal direction x and perpendicularly to the transverse direction y. With the vehicle seats 100, 200 installed in the vehicle, the vertical direction z extends parallel to the vehicle vertical axis.

The positional and directional indications used, such as, for example, front, rear, top and bottom, refer to a viewing direction of a person seated in one of the vehicle seats 100, 200 in a normal sitting position, wherein the vehicle seat 100, 200, when installed in the vehicle, is oriented in a use position suitable for passenger conveyance with upright backrests 110, 210 and, as usual, in the direction of travel. However, the vehicle seats 100, 200 according to the invention can also be installed in a different orientation, for example transversely to the direction of travel.

First of all, the vehicle seat 100 with precisely one seating position is described below. The vehicle seat 100 has a backrest 110 and a seat part 120. The backrest 110 comprises a supporting backrest structure and a backrest padding (not shown in the figures) The term backrest 110 is to be understood as meaning the entire assembly consisting of the backrest structure and the backrest padding. Where components are described as being articulated on the backrest 110, this is also to be understood as meaning an articulation on the backrest structure of the backrest 110. The seat part 120 comprises a seat cushion carrier which carries a seat part padding (not shown in the figures).

For the sake of simplicity, and where appropriate, only one vehicle seat side of the substantially symmetrical vehicle seat 100 will be described below, that is to say the components stated below, unless described differently, are present doubly (preferably mirror-symmetrically to one another). First of all, the vehicle seat 100 is described in a specific use position illustrated in FIG. 3, namely the design position, in which the backrest 110 is inclined rearwards by, for example, 23° with respect to the vertical direction z. Where the use position is described in the singular below, the description applies to all use positions, in particular to the design position.

The seat cushion carrier of the seat part 120 has a respective side part 122 on both seat sides. The two side parts 122 are connected to one another in a front region of the seat part 120 by means of a crossmember 124. The two side parts 122 and the crossmember 124 form a U-shaped seat cushion carrier.

A base 140 of the vehicle seat 100 can be connected to a body structure of the vehicle. In the present case, the base 140 has a first seat rail 142 which can be connected directly to the body structure, and a second seat rail 144 which can be displaced relative to the first in the longitudinal direction x. The two seat rails 142 and 144 with a substantially U-shaped profile engage mutually behind one another by way of their inwardly or outwardly bent longitudinal edges and can be locked to one another by means of a rail locking device known per se. The rail locking device can be unlocked by the user of the vehicle seat 100 by means of an unlocking bow known per se, for example.

An adapter 150, in the present case fixedly connected to the second seat rail 144, is mounted on the base 140. Alternatively, the adapter 150 can be formed in one piece with the second rail 144. However, in a modification of the exemplary embodiment, the adapter 150 can also be releasably locked to the base 140. The side part 122 of the seat part 120 is articulated on the adapter 150 by means of a front rocker 160, wherein the front rocker 160 has two ends and a respective joint is provided in the region of these two ends, of which a first joint I, in the present case a rotary joint, forms the articulation of the front rocker 160 on the adapter 150. The first joint I can be locked to the adapter 150 by means of a locking device 162 known per se. The locking device 162 can be constituted, in principle, by all known locking devices which are suitable for locking a pivoting movement between two components. For example, the locking device 162 may be a locking mechanism 1 as shown in U.S. Pat. No. 7,188,906 B2, which is hereby incorporated by reference in its entirety. The locking device 162 is therefore only schematically illustrated in the figures. With the locking device 162 unlocked, the front rocker 160 can be pivoted relative to the base 140. With the locking device 162 locked, a pivoting of the front rocker 160 relative to the base 140 is not possible. A second joint II, in the present case a turning and sliding joint, forms the articulation of the front rocker 160 on the side part 122, in the present case in a front end region of the side part 122. By virtue of a configuration of the second joint II as a turning and sliding joint, the second joint II of the front rocker 160 allows a turning movement and additionally a sliding movement (translation) with respect to the side part 122. In the present case, the second joint II comprises a slotted guide 126 in the side part 122 that is configured as an oblong hole, and a pin which is connected to the front rocker 160 and which is guided with limited displaceability in the slotted guide 126. The slotted guide 126 extends approximately parallel to the longitudinal direction x in the use position of the vehicle seat 100.

Furthermore, a rear rocker 170 is arranged on the base 140 behind the front rocker 160. The rear rocker 170 is connected to the rear rocker 170 of the right vehicle seat side via a transverse connection, in the present case a cross-tube 176. The rear rocker 170 is pivotably articulated on the base 140, in the present case the adapter 150, by means of a third joint III, in the present case a lockable rotary joint, configured as a lockable first fitting 172. As a result, a pivoting movement of the rear rocker 170 about the third joint III can be locked. Thus, the rear rocker 170 is connected by means of the third joint III in an articulated manner to the adapter 150 and thus in an articulated manner to the base 140.

The side part 122 of the seat part 120 is articulated on the rear rocker 170 by means of a fourth joint IV, in the present case a rotary joint. The fourth joint IV is arranged in a rear end region of the side part 122.

The backrest 110 is pivotably connected to the rear rocker 170 by means of a fifth joint V configured as a lockable second fitting 174. In an unlocked state of the second fitting 174, the backrest 110 is pivotable relative to the rear rocker 170, to be precise about a backrest pivot axis A extending parallel to the transverse direction y. The backrest 110 is adjustable in its inclination by means of the second fitting 174, with the result that a plurality of use positions are defined. In a modification of the exemplary embodiment, the fittings can be lockable in only one use position.

The rear rocker 170 is boomerang-shaped. The third joint III is arranged in a first end region of the rear rocker 170. The fifth joint V is arranged in a second end region of the rear rocker 170. The fourth joint IV is arranged between the third joint III and the fifth joint V, offset with respect to a linear imaginary connection line between the third joint III and the fifth joint V.

The joints I, II, III, IV, V described each allow a rotation about in each case an axis of rotation extending parallel to the transverse direction y. The joints I, II, III, IV, V are each present on both seat sides. The two fifth joints V form the backrest pivot axis A.

In the use position, in particular the design position, the first joint I is situated, as viewed in the longitudinal direction x, in front of the second joint II. A pin of the second joint II is arranged in the front region of the slotted guide 126. The front rocker 160 is oriented with a rearward inclination with respect to the vertical direction z. The locking device 162 and the fittings 172, 174 are locked.

Figure 5:
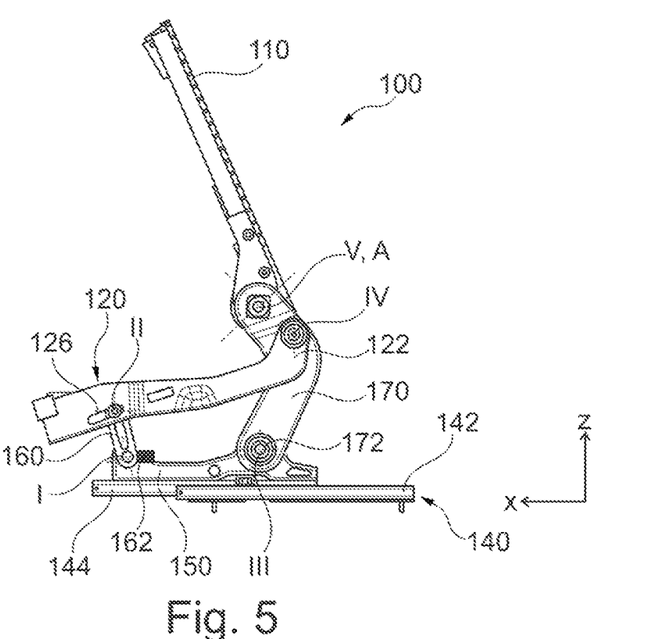
FIG. 5 is a schematic side view of the vehicle seat from FIG. 3 in the ingress position.

The vehicle seat 100 can be transferred from the use position illustrated in FIG. 1 that is suitable for passenger conveyance into an ingress position illustrated in FIG. 5. For this purpose, the locking device 162 and the first fitting 172 forming the third joint III are unlocked and the rear rocker 170 is pivoted forwards. Here, the pin of the second joint II moves rearwards in the slotted guide 126 relative to the side part 122. Pivoting the rear rocker 170 forwards also causes the backrest 110 articulated on the rear rocker 170 to be pivoted forwards. Here, the second fitting 174 forming the fifth joint V remains locked, with the result that the backrest 110 maintains its angular position relative to the rear rocker 170.

Figure 4:
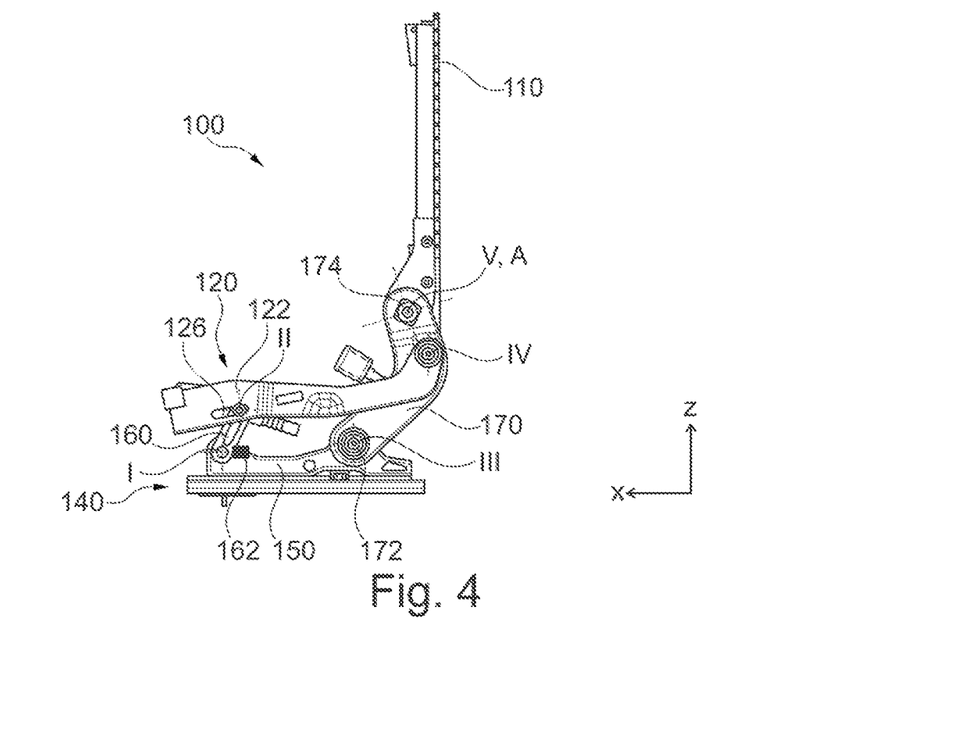
FIG. 4 is a schematic side view of the vehicle seat from FIG. 3 in an intermediate position between the use position and an ingress position.

FIG. 4 shows an intermediate position during the transfer from one of the use positions into the ingress position. In the ingress position, by comparison with the use positions, the vehicle seat 100 is moved forwards relative to the base 140. In the ingress position, the first joint I is situated, as viewed in the longitudinal direction x, behind the second joint II. The pin of the second joint II is arranged in the rear region of the slotted guide 126. The front rocker 160 is oriented with a forward inclination with respect to the vertical direction z. For securing the vehicle seat 100 in the ingress position, the locking device 162 and/or the first fitting 172 forming the third joint III can preferably also be lockable in the ingress position.

In the ingress position, the vehicle seat 100 is preferably additionally displaced forwards in the longitudinal direction x by means of the seat rails 142, 144. This facilitates access to a further seat row arranged behind the vehicle seat 100. The rail locking device can be coupled, for example, by means of a cable pull to the rear rocker 170 in such a way that, upon transfer from the use position into the ingress position, the pivoting movement of the rear rocker 170 automatically opens the rail locking device.

In addition, the vehicle seat 100 can be transferred from the use position into a floor position illustrated in FIG. 7 in which the backrest 110 is arranged substantially horizontally and a rear side of the backrest 110 can serve as an extended loading floor of a vehicle. To transfer the vehicle seat 100 from the use position into the floor position, the locking device 162 and the second fitting 174 forming the fifth joint V are unlocked and the front rocker 160 is pivoted back, whereas the backrest 110 is pivoted forwards. Here, the pin of the second joint II moves rearwards in the slotted guide 126 relative to the side part 122. The first fitting 172 forming the third joint III remains locked upon transfer into the floor position, with the result that the rear rocker 170 maintains its angular position relative to the base 140.

Figure 6:
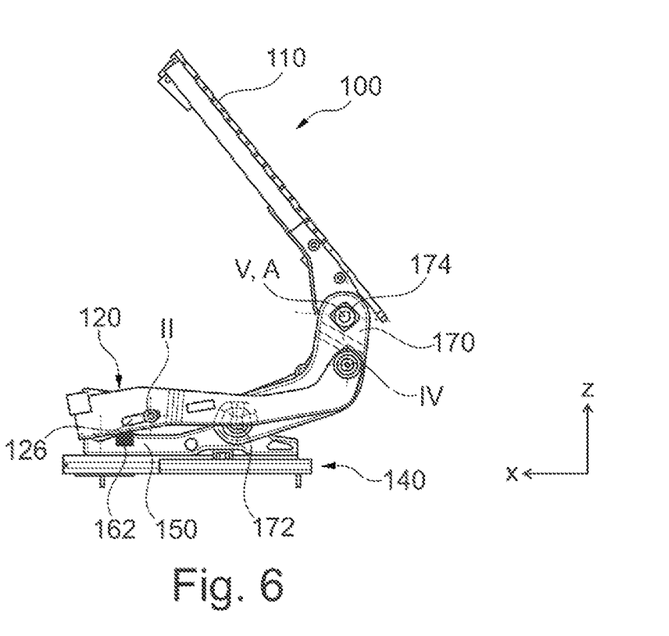
FIG. 6 is a schematic side view of the vehicle seat from FIG. 3 in an intermediate position between the use position and a floor position.

FIG. 6 shows an intermediate position during the transfer from one of the use positions into the floor position. In the floor position, by comparison with the use positions, the seat part 120 is lowered at the front, with the result that the backrest 110 can be pivoted forward into an approximately horizontal position. In the floor position, the first joint I is situated, as viewed in the longitudinal direction x, in front of the second joint II. The pin of the second joint II is arranged in the rear region of the slotted guide 126. By comparison with the use position, the front rocker 160 has a greater rearward inclination with respect to the vertical direction z. For securing the vehicle seat 100 in the floor position, the locking device 162 and/or the second fitting 174 forming the fifth joint V can preferably also be lockable in the floor position.

The vehicle seat 200 having two seating positions that is illustrated in FIGS. 1 and 2 corresponds in terms of its structure and its seat positions (use positions, ingress position and floor position) to the vehicle seat 100 having one seating position, unless described differently below. The description of the vehicle seat 100 having one seating position is, unless described differently below, thus also applicable to the vehicle seat 200 having two seating positions. Identical or identically acting components have reference signs increased by the value one hundred.

The vehicle seat 200 has a backrest 210 and a second backrest 212. In the present case, the backrest 210 is a constituent part of the outer left seating position of the seat row 1. In the present case, the backrest 212 is a constituent part of the central seating position of the seat row 1. A seat part 220 of the vehicle seat 200 corresponds in terms of its structure to the seat part 120 of the vehicle seat 100 having one seating position. In particular, the seat part 220 has two side parts 222 with a respective slotted guide 226 and a crossmember 224. The vehicle seat 200 has a base 240 on both sides, each comprising a first seat rail 242 which can be connected directly to the body structure, and a second seat rail 244 which is displaceable relative to the first in the longitudinal direction x. In addition, just like the vehicle seat 100, the vehicle seat 200 has, on both sides, an adapter 250, a front rocker 260, a locking device 262, a rear rocker 270, two fittings 272, 274 and a cross-tube 276.

The outer side of the vehicle seat 200 corresponds in terms of the seat kinematics, in particular in terms of the joints I, II, III, IV, V, to the above-described outer side of the vehicle seat 100. The inner side of the vehicle seat 200 differs slightly therefrom as described below. On the side facing the backrest 212, the backrest 210 is attached to the cross-tube 276 by means of the two fittings 274 forming the joints V and the backrest pivot axis A. For this purpose, the cross-tube 276 has a bracket 278. On its side facing the backrest 210, the central backrest 212 is articulated by means of a rotary bearing on the bracket 278 so as to be pivotable about the backrest pivot axis A. On its side facing away from the backrest 210, the backrest 212 is articulated on the rear rocker 270 by means of a fifth joint V so as to be pivotable about the backrest pivot axis A. The backrest 212 of the central seating position can be connected to the backrest 210 of the outer seating position by means of a rotary latch lock (not shown in the figures) which is fastened eccentrically with respect to the backrest axis of rotation A.

With the rotary latch lock unlocked, the central backrest 212 can be pivoted about the backrest pivot axis A independently of the outer backrest 210. Here, the fittings 272, 274 and the locking device 262 remain locked. The backrest pivot axis A remains fixed in position relative to the base 240.

With the rotary latch lock locked, the coupled-together backrests 210, 212 move during a transfer from the use position into the ingress position and during a transfer from the use position into the floor position in an analogous manner to the above-described backrest 110 of the vehicle seat 100 having one seating position. The kinematics, in particular the positions of the joints I, II, III, IV, V, corresponds to the kinematics of the vehicle seat 100 having one seating position.

The features disclosed in the above description, the claims and the drawings may be important both individually and in combination for the purpose of realizing the invention in its various configurations.

Although the invention has been described in detail in the drawings and the description above, what has been said and illustrated should be understood as being illustrative and exemplary and not restrictive. In particular, the choice of the proportions of the individual elements illustrated in the drawings should not be interpreted as necessary or limiting. Furthermore, the invention is in particular not limited to the exemplary embodiments explained. Further variants of the invention and the implementation thereof are apparent to a person skilled in the art from the above disclosure, the figures and the claims.

While specific embodiments of the invention have been shown and described in detail to illustrate the application of the principles of the invention, it will be understood that the invention may be embodied otherwise without departing from such principles.

APPENDIX

List of reference designations:

| | |
|---|---|
| 1 | Seat row |
| 100, 200 | Vehicle seat |
| 110, 210 | Backrest |
| 120, 220 | Seat part |
| 122, 222 | Side part |
| 124, 224 | Crossmember |
| 126, 226 | Slotted guide |
| 140, 240 | Base |
| 142, 242 | First seat rail |
| 144, 244 | Second seat rail |
| 150, 250 | Adapter |
| 160, 260 | Front rocker |
| 162, 262 | Locking device |
| 170, 270 | Rear rocker |
| 172, 272 | First fitting |
| 174, 274 | Second fitting |
| 176, 276 | Cross-tube |
| 212 | Backrest |
| 278 | Bracket |
| I | First joint |
| II | Second joint |
| III | Third joint |
| IV | Fourth joint |
| V | Fifth joint |
| A | Backrest pivot axis |
| x | Longitudinal direction |
| y | Transverse direction |
| z | Vertical direction |

What is claimed is:

1. A vehicle seat transferable from at least one use position suitable for passenger conveyance into at least one non-use position, the vehicle seat comprising:
   a seat part;
   a backrest;
   a base which is connectable to a vehicle;
   a front rocker pivotably articulated at a first joint on the base or on an adapter fixedly connected to the base, and pivotably articulated at a second joint on the seat part with limited second joint displaceability;
   a rear rocker pivotably articulated at a third joint on the base or on an adapter fixedly connected to the base and pivotably articulated at a fourth joint on the seat part;
   a locking device for locking a pivoting movement of the front rocker about the first joint, wherein:
   the backrest is pivotably connected to the rear rocker at a fifth joint; and
   a pivoting movement of the backrest about the fifth joint is lockable;
   wherein the third joint is comprised by a geared fitting or the fifth joint is comprised by a geared fitting or the third joint is comprised by a geared fitting and the fifth joint is comprised by a geared fitting.

2. A vehicle seat according to claim 1, wherein the third joint is comprised by a fitting.

3. A vehicle seat according to claim 2, wherein the fifth joint is comprised by a fitting.

4. A vehicle seat according to claim 1, wherein the fifth joint is comprised by a fitting.

5. A vehicle seat according to claim 4, further comprising a second backrest selectively pivotable, together with the backrest about a backrest pivot axis defined by the fifth joint, or selectively pivotable separately from the backrest about the backrest pivot axis defined by the fifth joint.

6. A vehicle seat according to claim 5, wherein the second backrest is lockable to the backrest by a lock.

7. A vehicle seat according to claim 4, wherein the third joint is comprised by a lockable latching fitting or the fifth joint comprised by a lockable latching fitting or the third joint is comprised by a lockable latching fitting and the fifth joint is comprised by a lockable latching fitting.

8. A vehicle seat according to claim 1, wherein the third joint is comprised by a lockable latching fitting or the fifth joint comprised by a lockable latching fitting or the third joint is comprised by a lockable latching fitting and the fifth joint is comprised by a lockable latching fitting.

9. A vehicle seat according to claim 8, further comprising a second backrest selectively pivotable, together with the backrest about a backrest pivot axis defined by the fifth joint, or selectively pivotable separately from the backrest about the backrest pivot axis defined by the fifth joint.

10. A vehicle seat according to claim 9, wherein the second backrest is lockable to the backrest by a lock.

11. A vehicle seat according to claim 1, wherein the vehicle seat is transferable from the at least one use position into an ingress position as the non-use position.

12. A vehicle seat according to claim 1, wherein the vehicle seat is transferable from the at least one use position into a floor position as the non-use position.

13. A vehicle seat according to claim 1, wherein the base comprises a seat rail arrangement configured for a longitudinal adjustment of the vehicle seat in a longitudinal direction.

14. A vehicle seat according to claim 1, further comprising a second backrest selectively pivotable, together with the backrest about a backrest pivot axis defined by the fifth joint, or selectively pivotable separately from the backrest about the backrest pivot axis defined by the fifth joint.

15. A vehicle seat according to claim 14, wherein the second backrest is lockable to the backrest by a lock.

16. A vehicle seat according to claim 1, further comprising a second backrest selectively pivotable, together with the backrest about a backrest pivot axis defined by the fifth joint, or selectively pivotable separately from the backrest about the backrest pivot axis defined by the fifth joint.

17. A vehicle seat according to claim 16, wherein the second backrest is lockable to the backrest by a lock.

18. A vehicle seat transferable from at least one use position suitable for passenger conveyance into at least one non-use position, the vehicle seat comprising:
- a seat part;
- a backrest;
- a base which is connectable to a vehicle;
- a front rocker pivotably articulated at a first joint on the base or on an adapter fixedly connected to the base, and pivotably articulated at a second joint on the seat part with limited second joint displaceability;
- a rear rocker pivotably articulated at a third joint on the base or on an adapter fixedly connected to the base and pivotably articulated at a fourth joint on the seat part;
- a locking device for locking a pivoting movement of the front rocker about the first joint, wherein:
- the backrest is pivotably connected to the rear rocker at a fifth joint;
- a pivoting movement of the backrest about the fifth joint is lockable; and
- a second backrest selectively pivotable, together with the backrest about a backrest pivot axis defined by the fifth joint, or selectively pivotable separately from the backrest about the backrest pivot axis defined by the fifth joint.

* * * * *